United States Patent [19]

Ichimura

[11] Patent Number: 5,331,237
[45] Date of Patent: Jul. 19, 1994

[54] STEPPING MOTOR

[75] Inventor: Hirotaka Ichimura, Nagano, Japan

[73] Assignee: Minebea Kabushiki Kaisha, Nagano, Japan

[21] Appl. No.: 52,165

[22] Filed: Apr. 23, 1993

[30] Foreign Application Priority Data

Apr. 28, 1992 [JP] Japan .................... 4-136186

[51] Int. Cl.⁵ .................................. H02K 15/12
[52] U.S. Cl. ........................ 310/44; 310/49 R
[58] Field of Search ............ 310/40 MM, 43, 44, 45, 310/49 R, 49 A, 89, 257, 258

[56] References Cited

U.S. PATENT DOCUMENTS

| 4,392,072 | 7/1983 | Rosenberry | 310/44 |
| 4,501,984 | 2/1985 | Mishima | 310/44 |
| 4,841,190 | 6/1989 | Matsushita et al. | 310/257 |
| 4,990,806 | 2/1991 | Kikuchi et al. | 310/49 R |
| 5,121,017 | 6/1992 | Yamamoto et al. | 310/49 R |
| 5,121,021 | 6/1992 | Ward | 310/43 |

FOREIGN PATENT DOCUMENTS 63-274355  11/1988  Japan ..................... 310/44

Primary Examiner—Steven L. Stephan
Assistant Examiner—Matthew Nguyen
Attorney, Agent, or Firm—Frishauf, Holtz, Goodman & Woodward

[57] ABSTRACT

A small-sized stepping motor provided with can-type stator yokes and one flat-type stator yoke, all of which are injection molded of a composite powder (i.e., a mixture of a metal powder of a soft magnetic material, a powder of a thermoplastic synthetic resin). The injection molded stator yokes have a considerably large specific electrical resistance, and the stepping motor is free from various disadvantages resulting from a small specific electric resistance.

4 Claims, 5 Drawing Sheets

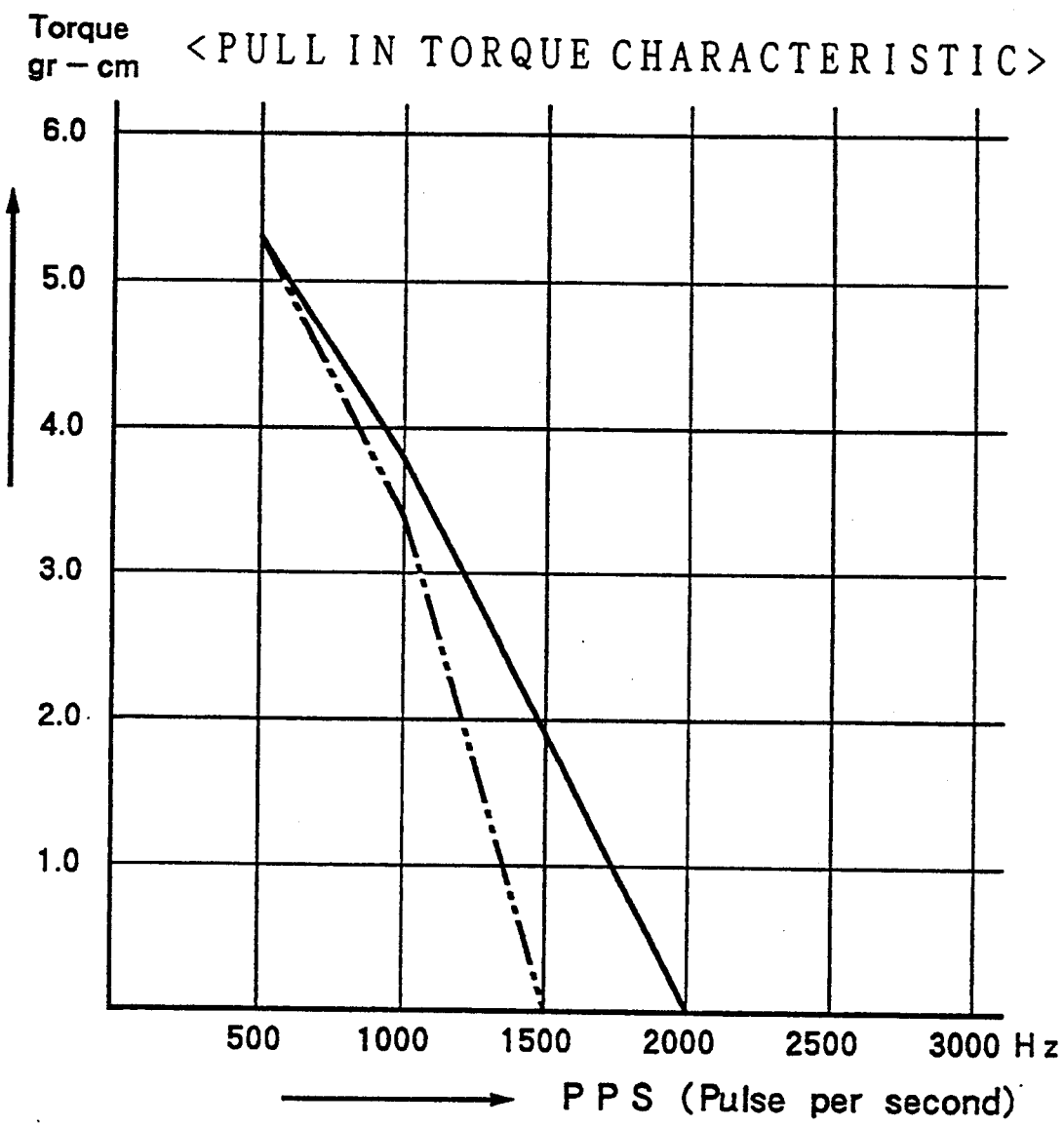

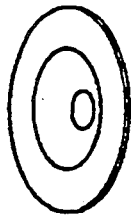
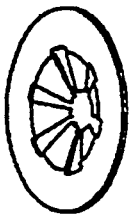
FIG. 4(a) PRIOR ART  FIG. 4(b) PRIOR ART  FIG. 4(c) PRIOR ART  FIG. 4(d) PRIOR ART 5,331,237

STEPPING MOTOR

BACKGROUND OF THE INVENTION

1. Field of the Invention

The present invention relates to a small-sized stepping motor adapted for office automation instruments.

2. Description of the Prior Art

As shown in FIG. 5, a conventional permanent-magnet (PM) type two-phase stepping motor is constructed of: a pair of can-type stator yokes 11, 11; a pair of flat-type stator yokes 12, 12; a pair of coils 13, 13; and, a rotor 4.

The conventional stator yokes are produced under a press working process of a material or sheet metal. In case of the flat-type stator yoke, as shown in FIG. 4, the stator yoke is produced through sequentially: a disk-blanking step (a) in which a disk blank is punched out of a sheet metal; a deep-drawing step (b) of the disk blank; a tooth-blanking step (c) of the thus deep-drawn disk blank; and a tooth-bending step (d) of the thus bent tooth of the deep-drawn disk blank. In production of the can-type stator yoke, similar sequential four steps may be used.

Problems to be solved by the present invention will be now described.

In a conventional method for producing the stator yoke of the small-sized stepping motor under the press working process, since the toothed portion of the stator yoke has a small size, press-working tools for producing such toothed portion are also small in size. Consequently, such press-working tools tend to break when they are subjected to a mechanical impact produced in the blanking operation. The thus damaged tools impair the product's or stator yoke's quality and result in poor product yields.

In addition, in the press working process, the material for the stator yoke must be a thin sheet metal subjected to severe thickness restrictions. Further, in a small-sized stepping motor, the stator yokes including toothed portions are subjected to severe shape restrictions.

Furthermore, in the press working process, it is necessary for the conventional stepping motor to produce two pieces of the stator yoke regardless of its type (i.e., regardless of the can-type or the flat-type), as shown in FIG. 5 with the reference numerals 12, 13.

In addition, the conventional stepping motor (the stator yokes of which are produced under the press working process and are low in specific electrical resistance) has a large in current loss due to such low specific electrical resistance, and, therefore due to the resultant eddy current produced in the stator yoke under the influence of a magnetic flux for driving the motor.

Particularly, the greater speed the motor obtains, the more energy loss the motor produces due to the eddy current. As a result, the percentage of input electric power effectively converted into a form of kinetic energy of the motor decreases, so that the conventional stepping motor suffers from poor torque at high speed.

In addition, since such eddy current is eventually converted into heat, the conventional small-sized motor (which is poor in available heat-radiation area) suffers from a high temperature in operation. Such high temperature adversely affects the conventional stepping motor in reliability.

Consequently, in the conventional small-sized stepping motor, in order to solve this poor-reliability problem due to the high temperature, the motor has its coil coated with an insulating film excellent in heat resistance. However, such insulating film is expensive, and, therefore increases the manufacturing cost of the product.

As described above, the conventional stepping motor (the stator yoke of which is constructed of the sheet metal) is disadvantageous in that: the specific electrical resistance of the stator yoke is low, which prevents the motor from accomplishing its high operation speed and its down sizing.

SUMMARY OF THE INVENTION

It is an object of the present invention to provide a stepping motor which is easily manufactured, excellent in product yields, requires only one piece of flat-type stator yoke and not two pieces, and eliminates disadvantages resulting from a small specific electrical resistance of a conventional stator yoke, whereby a high operation speed and a down sizing of the motor are accomplished.

The above objects of the present invention are accomplished by providing:

In a stepping motor comprising:

(a) a housing constructed of a pair of can-type stator yokes each of which is provided with a toothed portion in its inner surface for forming a plurality of magnetic poles;

(b) a rotor provided in the housing;

(c) a pair of coils which are disposed around the rotor in the housing; and (d) a flat-type stator yoke provided with a toothed portion forming a plurality of magnetic poles which correspond to those of the toothed portions of the can-type stator yokes, the flat-type stator yoke being disposed in the housing;

the improvement wherein:

(e) both of the can-type stator yokes and the flat-stator yoke are produced by injection molding a composite powder in which a metal powder of a soft magnetic material is mixed with a powder of a thermoplastic synthetic resin, the flat-type stator yoke being provided with its magnetic poles in opposite sides thereof and having its magnetic poles correspond to those of the can-type stator yokes.

BRIEF DESCRIPTION OF THE DRAWINGS

FIG. 3 is a graph of the characteristics of the stepping motor of the present invention with reference to the conventional stepping motor, illustrating the torque of the motor with "pulse per second";

FIGS. 4(a), 4(b), 4(c) and 4(d) are views showing sequential process steps for producing the stator yoke of the conventional stepping motor.

DESCRIPTION OF THE PREFERRED EMBODIMENT

Now, the present invention will be described in detail with reference to the drawings.

Figure 1:
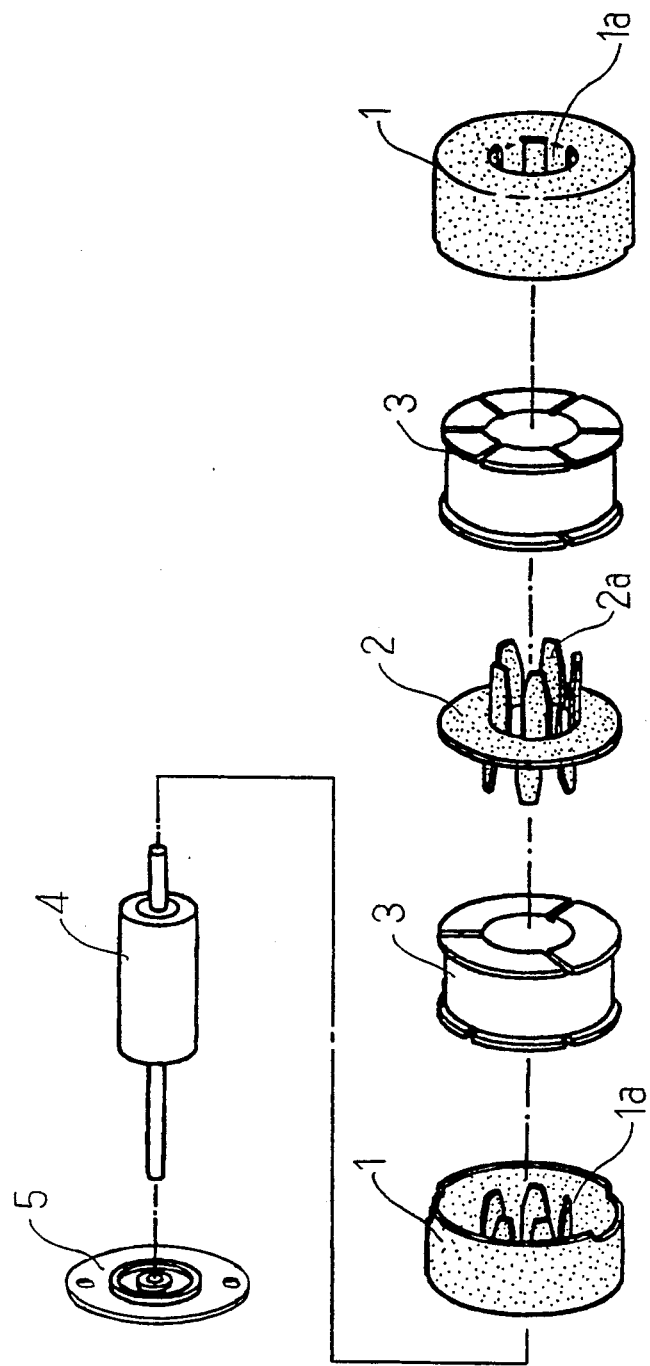
FIG. 1 is an exploded perspective view of the stepping motor of the present invention.

In FIG. 1, there is shown an exploded perspective view of a stepping motor of the present invention. In FIG. 1: the reference numerals 1, 1 denote a pair of can-type stator yokes which form a housing of the motor; 2 a flat-type stator yoke; 3, 3 a pair of coils; 4 a rotor; 5 a flange plate; 1a, 2a toothed portions (which form magnetic poles) of the stator yokes.

In the present invention, a composite powder (which is a mixture of a metal powder of a soft magnetic material and a powder of a thermoplastic synthetic resin) is used as material of a pair of can-type stator yokes 1, 1 and a flat-type stator yoke 2. The metal powder is preferably an iron powder, and the thermoplastic synthetic resin may be one of polypropylene resins.

The thus prepared composite powder having the above composition is loaded into an injection molding machine in which the powder is pressed and heated so as to be molded into a product, i.e., stator yoke having a predetermined shape.

Figure 2:
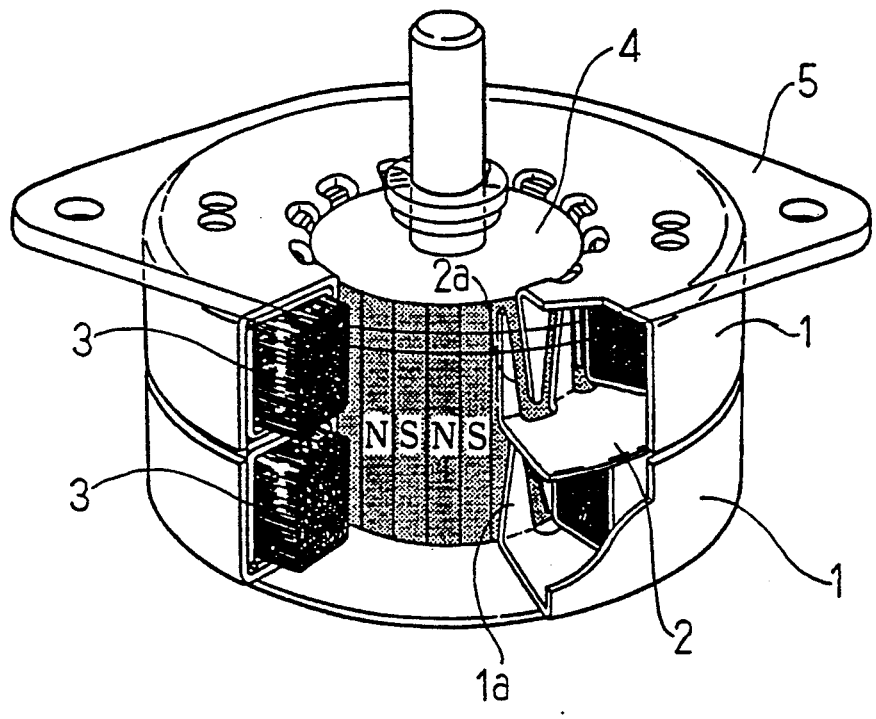
FIG. 2 is a partially broken perspective view of the stepping motor of the present invention.
Figure 5:
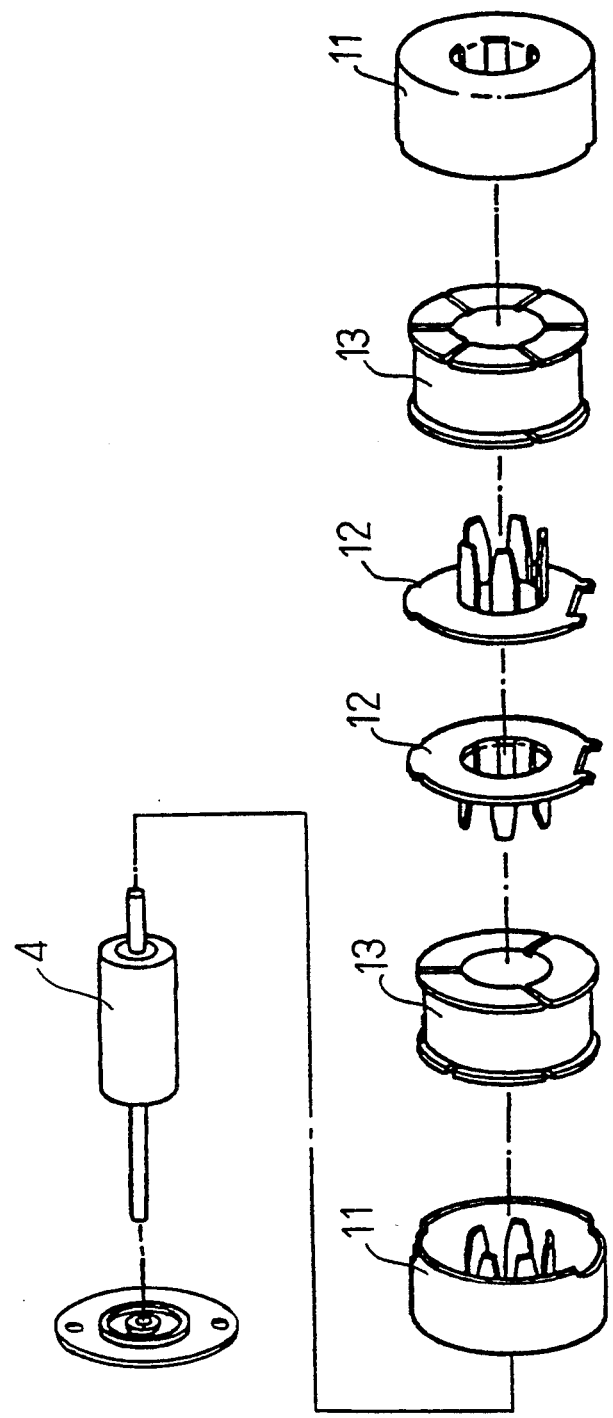
FIG. 5 is an exploded perspective view of the conventional stepping motor.

The thus injection-molded stator yokes 1, 1, 2 are incorporated in a stepping motor of the present invention shown in FIG. 2, which motor of the present invention is compared in characteristics with a conventional stepping motor provided with stator yokes having been produced under a conventional press working process. There is no difference in diameter of a rotor between the stepping motor of the present invention and the conventional stepping motor. FIG. 3 shows results in measurement of "Pull-in torque" (i.e., starting-torque) characteristics of the stepping motor of the present invention in comparison with those of the conventional stepping motor.

As is appreciated from the graph of FIG. 3 showing torque with "pulse per second"), the maximum limit in starting frequency of the conventional stepping motor (which is provided with the stator yokes constructed of sheet metals) is approximately 1500 Hz, while that of the stepping motor of the present invention (which is provided with the molded stator yokes) is approximately 2000 Hz which is wider in frequency band than the above 1500 Hz by approximately 500 Hz.

In the present invention, since the stator yokes can be produced under the injection molding process, the stepping motor of the present invention requires much less steps in manufacturing process than those required in manufacturing of the conventional stepping motor (the stator yoke of which is produced under the manual press working process of the sheet metal). Further, the present invention enables the toothed portion of the stator yoke of the small-sized stepping motor to be precisely molded into a predetermined shape, and, therefore can prevent a defective product from being produced to considerably increase the product yields.

In addition, in the stepping motor of the present invention, the required number of the flat-type stator yokes is one not two, which enable the motor to reduce the total number of its parts and leads to reduction in manufacturing cost of the motor of the present invention.

Further, since the stator yoke of the present invention is produced by molding the mixture (in which the metal powder of soft magnetic material is mixed with a binder, i.e., the powder of the synthetic resin having a large electrical insulation resistance), the stator yoke is excellent in specific electrical resistance, which substantially prevents the occurrence of eddy currents in operation. Therefore, in the stepping motor of the present invention, electric current loss is small, and, therefore the heat resulting from such loss is also small. In other words, the stator yoke of the present invention having the above construction realizes a small-sized, high-performance, high-speed and reliable stepping motor in which the toothed portion of the stator yoke is precisely molded.

What is claimed is:

1. In a stepping motor comprising:
    (a) a housing comprising a pair of can-type stator yokes each of which is provided with a toothed portion in an inner surface thereof for forming a plurality of magnetic poles;
    (b) a rotor provided in said housing;
    (c) a pair of coils disposed around said rotor in said housing; and
    (d) a flat-type stator yoke provided with a toothed portion forming a plurality of magnetic poles which correspond to those of said toothed portions of said can-type stator yokes, said flat-type stator yoke being disposed in said housing;

the improvement comprising:
    (e) both of said can-type stator yokes being injection molded yokes formed of an injection molded composite powder in which a metal powder of a soft magnetic material is mixed with a powder of a thermoplastic synthetic resin; and
    (f) said flat-type stator yoke being a one-piece, integrated injection molded yoke formed of an injection molded composite powder in which a metal powder of a soft magnetic material is mixed with a powder of a thermoplastic synthetic resin which is the same as that of said can-type stator yokes, and said flat-type stator yoke being provided with its magnetic poles extending from opposite sides thereof and having its magnetic poles correspond to those of said can-type stator yokes.

2. The stepping motor as set forth in claim 1, wherein: said metal powder is made of iron.

3. The stepping motor as set forth in claim 1, wherein: said powder of thermoplastic synthetic resin of said composite powder which is molded into both of said can-type stator yokes and said flat-type stator yoke is made of polypropylene resins.

4. The stepping motor as set forth in claim 1, wherein: said composite powder molded into both of said can-type stator yokes and said flat-type stator yoke is a mixture of an iron powder and a powder of polypropylene resins.

\* \* \* \* \*